United States Patent [19]

Ohno

[11] Patent Number: 5,552,936
[45] Date of Patent: Sep. 3, 1996

[54] TWO-UNIT ZOOM LENS

[75] Inventor: Kazunori Ohno, Ohmiya, Japan

[73] Assignee: Fuji Photo Optical Co., Ltd., Saitama-ken, Japan

[21] Appl. No.: 962,469

[22] Filed: Oct. 16, 1992

[30] Foreign Application Priority Data

Dec. 11, 1991 [JP] Japan .................................. 3-327829

[51] Int. Cl.⁶ ............................ G02B 15/14; G02B 13/18
[52] U.S. Cl. ........................................... 359/691; 359/717
[58] Field of Search .................................. 359/691, 717, 359/716, 692, 686–690

[56] References Cited

U.S. PATENT DOCUMENTS

| | | |
|---|---|---|
| 3,116,359 | 12/1963 | Solisch . |
| 5,005,955 | 4/1991 | Ohshita ................................ 359/691 |
| 5,270,867 | 12/1993 | Estelle ................................. 359/717 |
| 5,283,693 | 2/1994 | Kohno et al. ........................ 359/691 |
| 5,305,148 | 4/1994 | Ikemori et al. ..................... 359/716 |

FOREIGN PATENT DOCUMENTS

| | | |
|---|---|---|
| 4-46308 | 2/1992 | Japan . |
| 4-46309 | 2/1992 | Japan . |
| 4-46310 | 2/1992 | Japan . |

*Primary Examiner*—Scott J. Sugarman
*Attorney, Agent, or Firm*—Brumbaugh, Graves, Donohue & Raymond

[57] ABSTRACT

A two-unit zoom lens comprises a first lens unit having a negative refracting power and a second lens unit having a positive refracting power. The first lens unit and the second lens unit are located in this order from the side of an object. At least either one of the first lens unit and the second lens unit is moved such that a distance between the first lens unit and the second-set lens unit, which distance is taken along an optical axis, may change, and a focal length of the whole two-unit zoom lens is thereby changed continuously. Each of the first lens unit and the second lens unit is constituted of a single lens component having at least a single aspherical surface.

3 Claims, 6 Drawing Sheets

TWO-UNIT ZOOM LENS

BACKGROUND OF THE INVENTION

1. Field of the Invention

This invention relates to a zoom lens composed of two sets of lenses. This invention particularly relates to a two-unit zoom lens, which has a zoom ratio for low magnification and which is suitable for a taking lens.

2. Description of the Prior Art

Recently, the so-called "films with lenses", which are simply constituted of films and lenses, are used widely.

Such films with lenses are required to have increasingly higher functions. For example, films with lenses having flash functions have been put into practice. It is considered that, in the future, films with lenses having zoom functions will be required.

However, the films with lenses are required to be marketed at as low prices as possible, and therefore it is necessary for the manufacturing costs of the films with lenses to be kept as low as possible. Additionally, the films with lenses should be compact so that they may be dealt with easily. Also for the films with lenses having zoom functions, it is important that their manufacturing costs are kept as low as possible and they are compact. Therefore, it is necessary that the zoom lenses themselves are simple in structure, low in cost, and compact in size.

SUMMARY OF THE INVENTION

The primary object of the present invention is to provide a two-unit zoom lens, which enables a film with lens having zoom functions to be manufactured at a low manufacturing cost and compactly.

The present invention provides a two-set zoom lens comprising a first lens unit having a negative refracting power and a second lens unit having a positive refracting power, the first lens unit and the second-set lens unit being located in this order from the side of an object, and at least either one of the first lens unit and the second lens unit being moved such that a distance between the first lens unit and the second-set lens, which distance is taken along an optical axis, may change, whereby a focal length of the whole two-unit zoom lens is changed continuously, wherein each of the first lens unit and the second lens unit is constituted of a single lens component having at least a single aspherical surface.

The term single lens component as used herein means not only an exactly single lens element but also a combination of a plurality of lens elements which are laminated together into a single lens component having an interface which is not optically active as represented by the dash lines in the drawings.

With the two-unit zoom lens in accordance with the present invention, a concave lens, which serves as the first lens unit, and a convex lens, which serves as the second lens unit, are located in this order from the side of the object. Each of the two lenses is constituted of a single lens component having at least a single aspherical surface.

The two-unit zoom lens in accordance with the present invention has the simple lens structure described above. Therefore, the manufacturing cost of the zoom lens can be kept markedly low, and the zoom function part can be kept compact. Additionally, experiments revealed that, even with such a simple lens structure, a lens brightness and a zoom ratio can be obtained which are sufficient for a zoom lens to be used in a film with lens.

Therefore, by the utilization of the two-unit zoom lens in accordance with the present invention for a film with lens, the zoom function can be added to the film with lens such that the essential requirements for the film with lens with respect to the cost and the size may be satisfied.

DESCRIPTION OF THE PREFERRED EMBODIMENTS

The present invention will hereinbelow be described in further detail with reference to the accompanying drawings.

Figure 1:
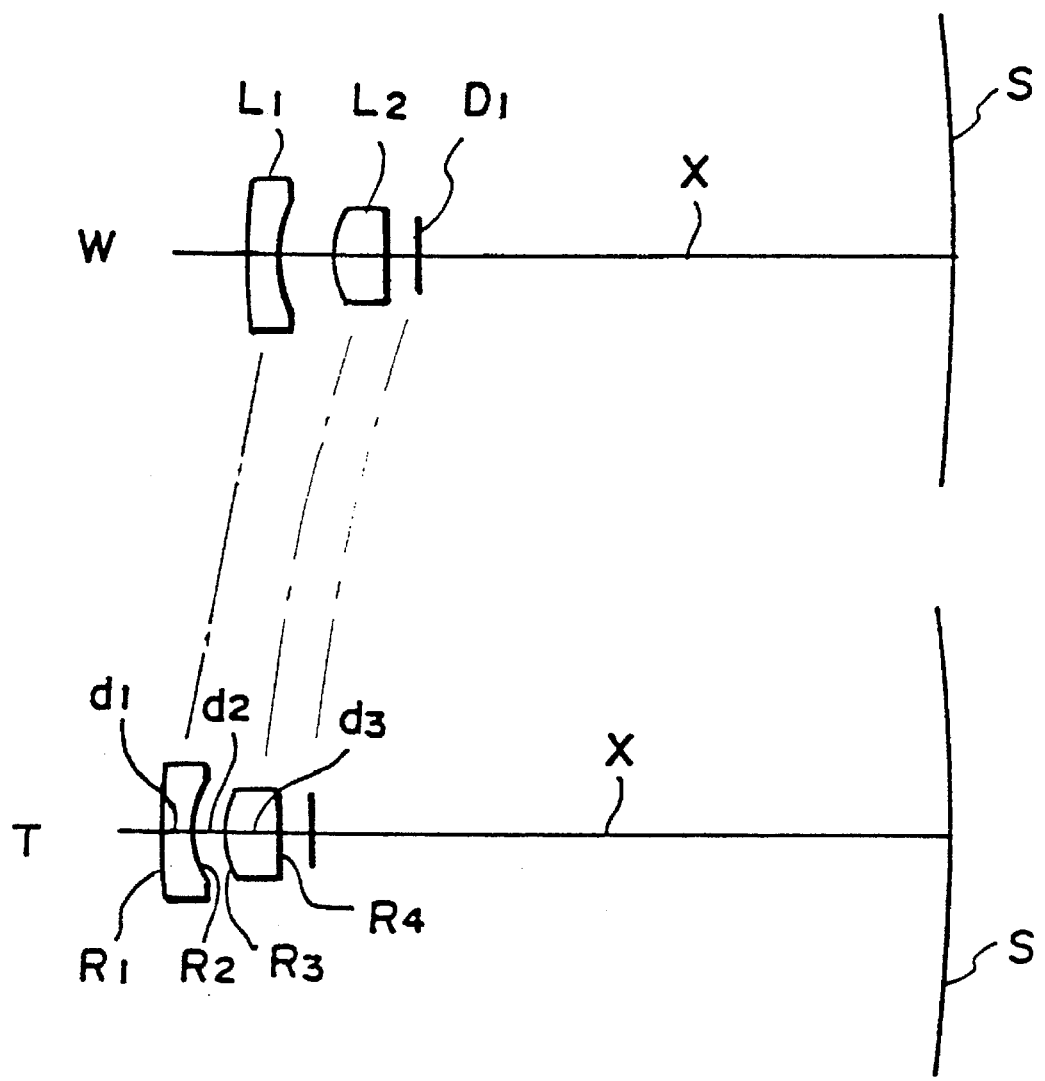
FIG. 1 is a sectional view showing a first embodiment of the two-unit zoom lens in accordance with the present invention.
Figure 2:
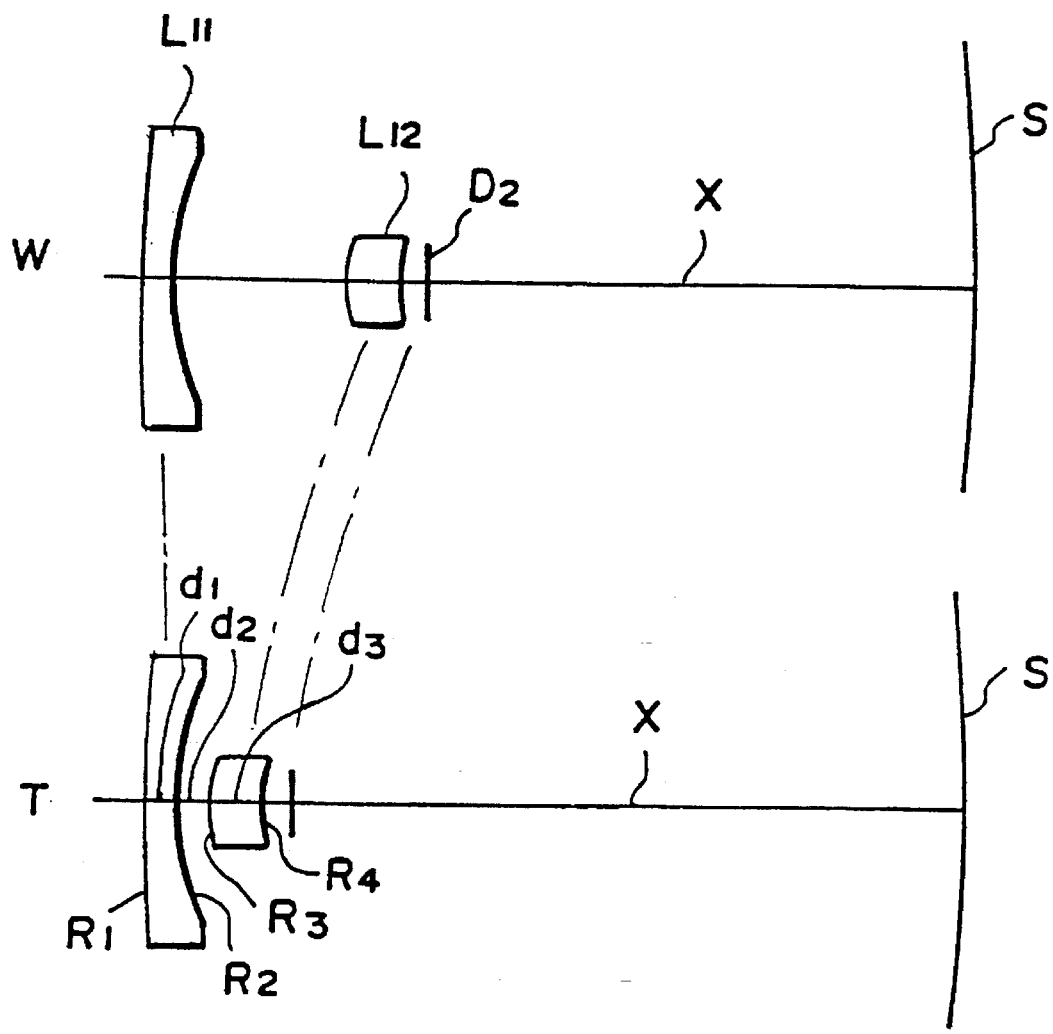
FIG. 2 is a sectional view showing a second embodiment of the two-set zoom lens in accordance with the present invention.
Figure 3:
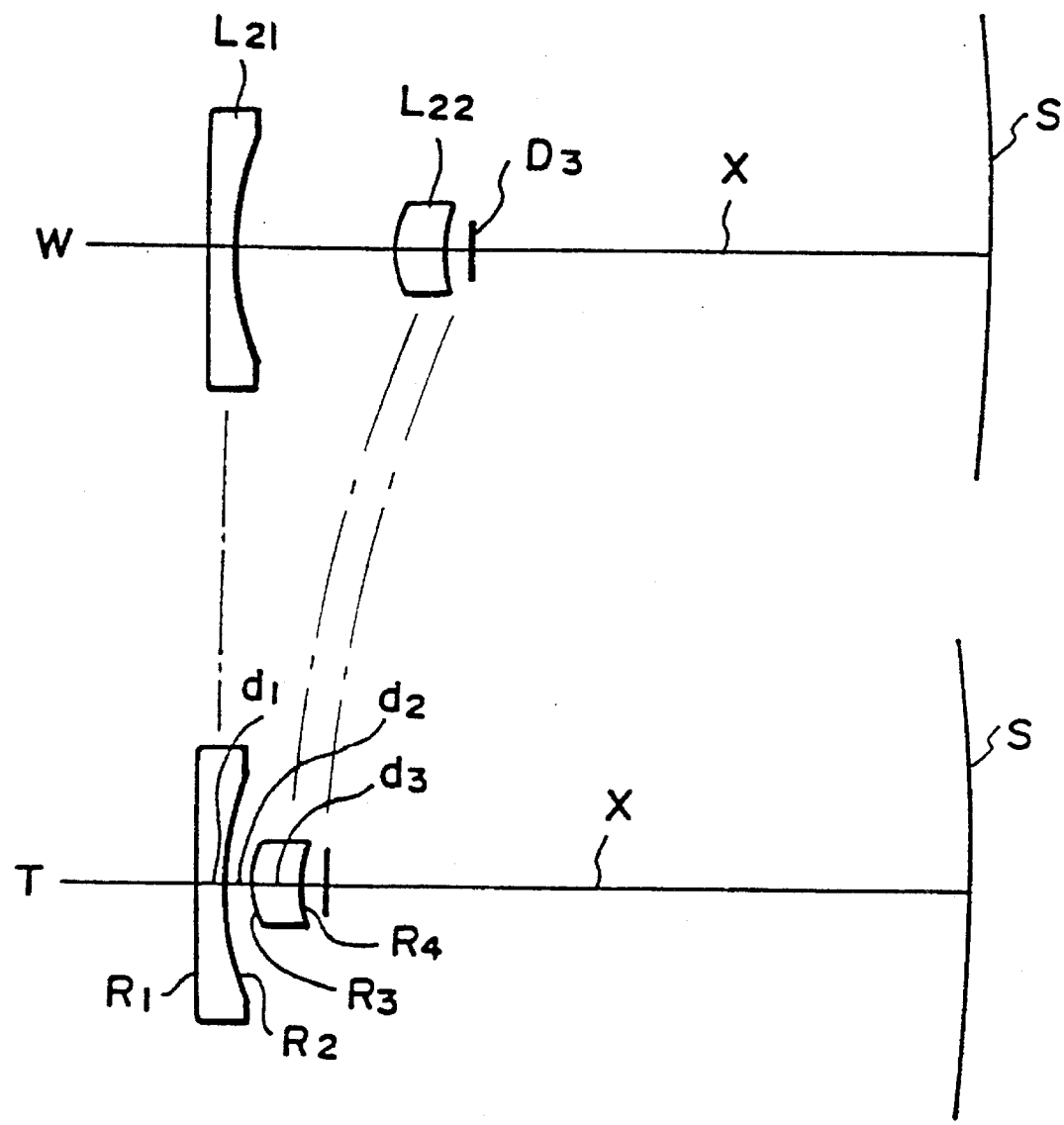
FIG. 3 is a sectional view showing a third embodiment of the two-unit zoom lens in accordance with the present invention.

FIGS. 1, 2, and 3 are sectional views showing the embodiments of the two-unit zoom lens in accordance with the present invention, which have values set as shown in Table 1. In Table 1, f1 represents the focal length of the first lens unit (f2 represents the focal length of the second lens unit, and fw represents the focal length of the whole lens system at a wide angle end (W).

TABLE 1

|  | First Embodiment | Second Embodiment | Third Embodiment |
| --- | --- | --- | --- |
| Zoom Ratio | 1.25 | 1.46 | 1.46 |
| $|f_1/f_w|$ | 0.55 | 1.28 | 1.25 |

Specifically, FIG. 1 is a sectional view showing a first embodiment of the two-unit zoom lens in accordance with the present invention. In this embodiment, the first lens unit having a negative refracting power is constituted of a single lens component L1, and the second lens unit having a positive refracting power is constituted of a single lens component L2. The lens component L1 is a negative meniscus lens, whose concave surface stands facing the side of an image surface S. The lens component L2 is a positive meniscus lens, whose convex surface stands facing the side of an object. A focal length f1 of the lens component L1 is −16.07 mm, and a focal length f 2 of the lens component L2 is 11.54 mm. During the zooming from the wide angle end (W) to a telescopic end (T), the lens component L1 moves at uniform speed towards the side of the object, and the lens component L2 and a diaphragm D1 move together so as to decelerate towards the side of the object. As a result, an axial air separation d2 between the lens component L1 and the lens component L2 decreases little by little. In FIG. 1, X represents the optical axis (this also applies to X in FIGS. 2 and 3).

Table 2 shows the radii of curvature R* (mm) of the surfaces of the respective lenses, which radii of curvature are taken at positions in the vicinity of the optical axis X, the axial thicknesses d1 (mm) and d3 (mm) of the lenses L1 and L2, and the axial air separation d2 between the lenses L1 and L2 in the first embodiment. Table 2 also shows the refractive indices N of the respective lenses with respect to the d-line, and the Abbe's dispersion numbers v of the respective lenses in the first embodiment.

In Table 2, numbers affixed to reference characters R, d, N, and v represent the order from the side of the object.

The surfaces of the lens component L1 and the lens component L2 are aspherical, and their shapes are represented by the aspherical formula $$x = \frac{ch^2}{1 + \sqrt{1 - kc^2 h^2}} + a_1 h^4 + a_2 h^6 + a_3 h^8$$

wherein coefficients c, k, a1, a2, and a3 take the values listed in Table 3. In the aspherical formula, x represents the distance from the lens surface, which distance is taken in the direction along the optical axis, and h represents the distance from the optical axis, which distance is taken in the direction normal to the optical axis. Also, c represents the curvature.

TABLE 2

| | | | |
|---|---|---|---|
| $R_1^*$ = 91.1709 | $d_1$ = 1.50 | $N_1$ = 1.49244 | $v_1$ = 57.6 |
| $R_2^*$ = 7.2408 | $d_2$ = 2.75 ~ 1.50 | | |
| $R_3^*$ = 4.2297 | $d_3$ = 3.00 | $N_2$ = 1.49244 | $v_2$ = 57.6 |
| $R_4^*$ = 12.6767 | | | |

TABLE 3

| | c(curvature) | k | $a_1$ | $a_2$ | $a_3$ |
|---|---|---|---|---|---|
| $R_1$ | 0.0109684 | 176.53195 | $-7.4128485 \times 10^{-7}$ | $-2.41373 \times 10^{-6}$ | $1.3239 \times 10^{-8}$ |
| $R_2$ | 0.1381063 | $-2.950346$ | $1.6162511 \times 10^{-3}$ | $-4.1115 \times 10^{-6}$ | $-5.7203 \times 10^{-1}$ |
| $R_3$ | 0.2364234 | 1.353396 | $-1.1546089 \times 10^{-4}$ | $1.2114 \times 10^{-4}$ | $-3.0397 \times 10^{-6}$ |
| $R_4$ | 0.0788849 | 36.169838 | $6.4312386 \times 10^4$ | $1.4773 \times 10^4$ | $1.63517 \times 10^{-10}$ |

Table 4 shows the focal lengths f and the back focal lengths bf of the whole lens system at the wide angle end (W) and at the telescopic end (T). The image surface S (or the film surface) is concave, and its radius of curvature is $-125.0$ mm (this also applies to Example 2 and Example 3).

TABLE 4

| | W | T |
|---|---|---|
| f | 29.46 | 36.78 |
| bf | 29.99 | 35.25 |

FIG. 2 is a sectional view showing a second embodiment of the two-unit zoom lens in accordance with the present invention. In this embodiment, as in the aforesaid first embodiment, the first lens unit having a negative refracting power is constituted of a single lens component L11, and the second lens unit having a positive refracting power is constituted of a single lens component L12. The lens component L11 is a negative meniscus lens, whose concave surface stands facing the side of an image surface S. The lens component L12 is a positive meniscus lens, whose convex surface stands facing the side of an object. A focal length f1 of the lens component L11 is $-36.96$ mm, and a focal length f2 of the lens component L12 is 19.41 mm. During the zooming from the wide angle end (W) to a telescopic end (T), the lens component L11 moves at uniform speed towards the side of the object, and the lens component L12 and a diaphragm D2 move together so as to decelerate towards the side of the object. As a result, an axial air separation d2 between the lens component L11 and the lens component L12 decreases little by little.

Table 5 shows the radii of curvature R* (mm) of the surfaces of the respective lenses, which radii of curvature are taken at positions in the vicinity of the optical axis X, the axial thicknesses d1 (mm) and d3 (mm) of the lenses L11 and L12, and the axial air separation d2 between the lenses L11 and L12 in the second embodiment. Table 5 also shows the refractive indices N of the respective lenses with respect to the d-line, and the Abbe's dispersion numbers v of the respective lenses in the second embodiment.

In the second embodiment, the coefficients c, k, a1, a2, and a3 in the aforesaid aspherical formula take the values listed in Table 6.

As in Table 2, numbers affixed to the respective reference characters represent the order from the side of the object.

TABLE 5

| | | | |
|---|---|---|---|
| $R_1^*$ = $-124.1687$ | $d_1$ = 1.50 | $N_1$ = 1.49244 | $v_1$ = 57.6 |
| $R_2^*$ = 21.4086 | $d_2$ = 9.30 ~ 1.50 | | |
| $R_3^*$ = 5.1707 | $d_3$ = 3.00 | $N_2$ = 1.49244 | $v_2$ = 57.6 |
| $R_4^*$ = 9.1068 | | | |

TABLE 6

| | c(curvature) | k | $a_1$ | $a_2$ | $a_3$ |
|---|---|---|---|---|---|
| $R_1$ | $-0.008054$ | 177.95278 | $2.756456 \times 10^{-4}$ | $-2.92709 \times 10^{-6}$ | $1.24819 \times 10^{-8}$ |
| $R_2$ | 0.0467102 | $-26.94468$ | $6.23202 \times 10^{-4}$ | $-4.75034 \times 10^{-6}$ | $-6.26095 \times 10^{-10}$ |
| $R_3$ | 0.1933974 | 0.0117308 | $1.036058 \times 10^{-3}$ | $1.21024 \times 10^{-4}$ | $-3.03968 \times 10^6$ |
| $R_4$ | 0.1098081 | 7.6914645 | $4.71500 \times 10^{-4}$ | $1.47725 \times 10^{-4}$ | $1.63473 \times 10^{-10}$ |

Table 7 shows the focal lengths f and the back focal lengths bf of the whole lens system at the wide angle end (W) and at the telescopic end (T) in the second embodiment.

TABLE 7

|    | W     | T     |
|----|-------|-------|
| f  | 28.84 | 42.00 |
| bf | 30.84 | 37.76 |

FIG. 3 is a sectional view showing a third embodiment of the two-unit zoom lens in accordance with the present invention. In this embodiment, as in the aforesaid first embodiment, the first lens unit having a negative refracting power is constituted of a single lens component L21, and the second lens unit having a positive refracting power is constituted of a single lens component L22. The lens component L21 is a negative meniscus lens, whose concave surface stands facing the side of an image surface S. The lens component L22 is a positive meniscus lens, Whose convex surface stands facing the side of an object. A focal length f1 of the lens component L21 is −35.93 mm, and a focal length f2 of the lens component L22 is 19.02 mm. During the zooming from the wide angle end (W) to a telescopic end (T), the lens component L21 moves so as to decelerate towards the side of the object, and the lens component L22 and a diaphragm D3 move together at non-uniform speed towards the side of the object. As a result, an axial air separation d2 between the lens component L21 and the lens component L22 decreases little by little.

Table 8 shows the radii of curvature R* (mm) of the surfaces of the respective lenses, which radii of curvature are taken at positions in the vicinity of the optical axis X, the axial thicknesses d1 (mm) and d3 (mm) of the lenses L21 and L22, and the axial air separation d2 between the lenses L21 and L22 in the third embodiment. Table 8 also shows the refractive indices N of the respective lenses with respect to the d-line, and the Abbe's dispersion numbers ν of the respective lenses in the third embodiment.

In the third embodiment, the coefficients c, k, a1, a2, and a3 in the aforesaid aspherical formula take the values listed in Table 9.

As in Table 2, numbers affixed to the respective reference characters represent the order from the side of the object.

TABLE 8

| $R_1^* = -136.7800$ | $d_1 = 1.50$        | $N_1 = 1.49244$ | $\nu_1 = 57.6$ |
|---------------------|---------------------|-----------------|----------------|
| $R_2^* = 20.3969$   | $d_2 = 8.92 \sim 1.50$ |                 |                |
| $R_3^* = 4.9528$    | $d_3 = 3.00$        | $N_2 = 1.49700$ | $\nu_2 = 81.6$ |
| $R_4^* = 8.3138$    |                     |                 |                |

TABLE 9

|       | c(curvature) | k         | $a_1$                    | $a_2$                     | $a_3$                     |
|-------|--------------|-----------|--------------------------|---------------------------|---------------------------|
| $R_1$ | −0.007311    | 178.61513 | $2.094807 \times 10^{-4}$ | $-2.9214 \times 10^{-6}$  | $1.24288 \times 10^{-8}$  |
| $R_2$ | 0.049027     | −22.05186 | $4.7889 \times 10^{-4}$  | $-4.75897 \times 10^{-6}$ | $-6.11366 \times 10^{-10}$ |
| $R_3$ | 0.2019059    | −0.105062 | $1.11923 \times 10^{-3}$ | $1.20997 \times 10^{-4}$  | $-3.03968 \times 10^{-6}$ |
| $R_4$ | 0.1202819    | 6.461642  | $3.8846 \times 10^{-4}$  | $1.47726 \times 10^{-4}$  | $1.63501 \times 10^{-10}$ |

Table 10 shows the focal lengths f and the back focal lengths bf of the whole lens system at the wide angle end (W) and at the telescopic end (T) in the third embodiment.

TABLE 10

|    | W     | T     |
|----|-------|-------|
| f  | 28.84 | 42.00 |
| bf | 30.45 | 37.42 |

The three embodiments described above are designed such that the value of |f1/fw| may be small. Particularly, the first embodiment is designed such that the value of |f1/fw| may be as small as 0.55. In cases where the value of |f1/fw| is set at a small value, the movement distances of both lens units can be kept small. This feature allows a film with lens to be kept compact.

Figure 4:
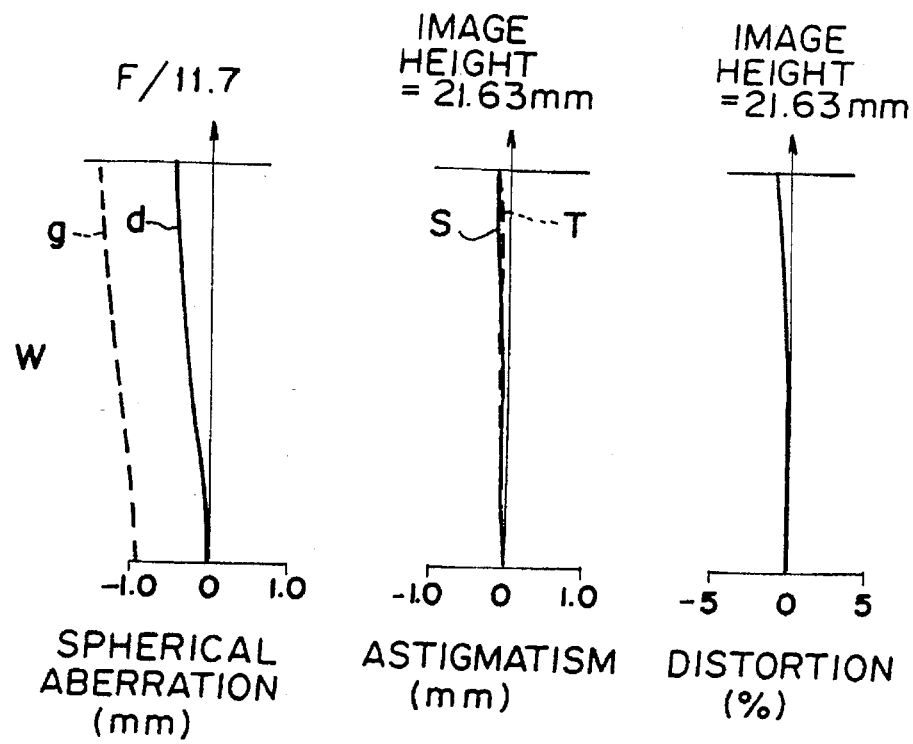
FIG. 4 is a diagram showing the aberrations of the first embodiment of the two-unit zoom lens in accordance with the present invention.
Figure 4:
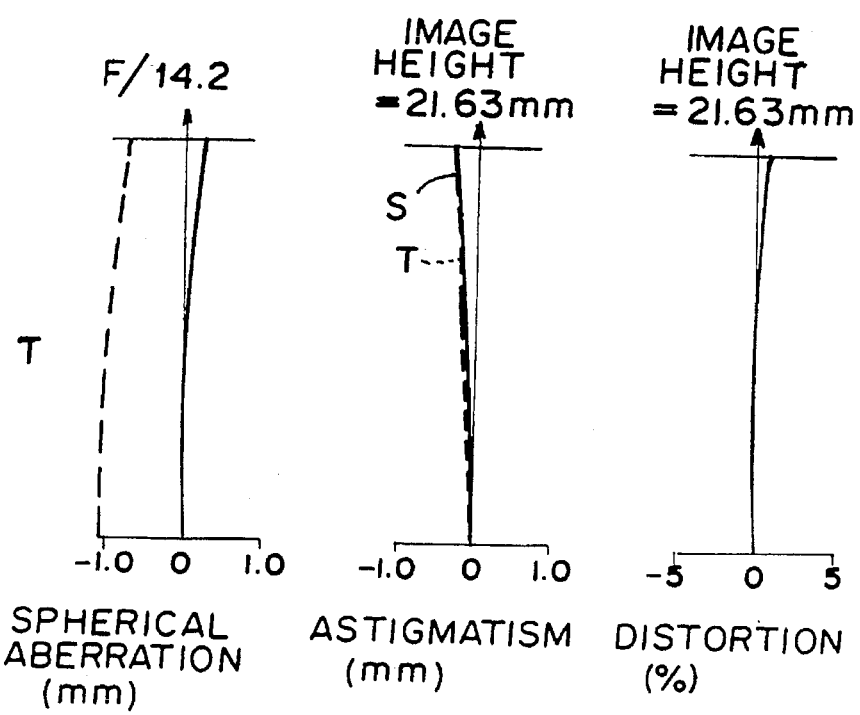
Figure 5:
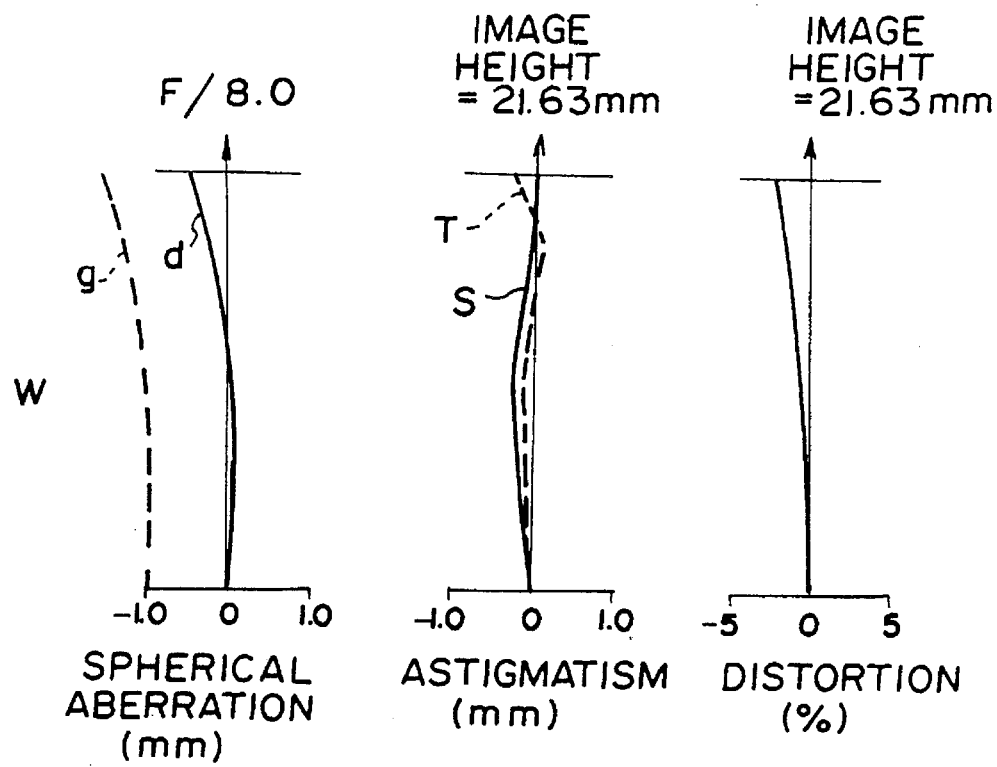
FIG. 5 is a diagram showing the aberrations of the second embodiment of the two-unit zoom lens in accordance with the present invention.
Figure 5:
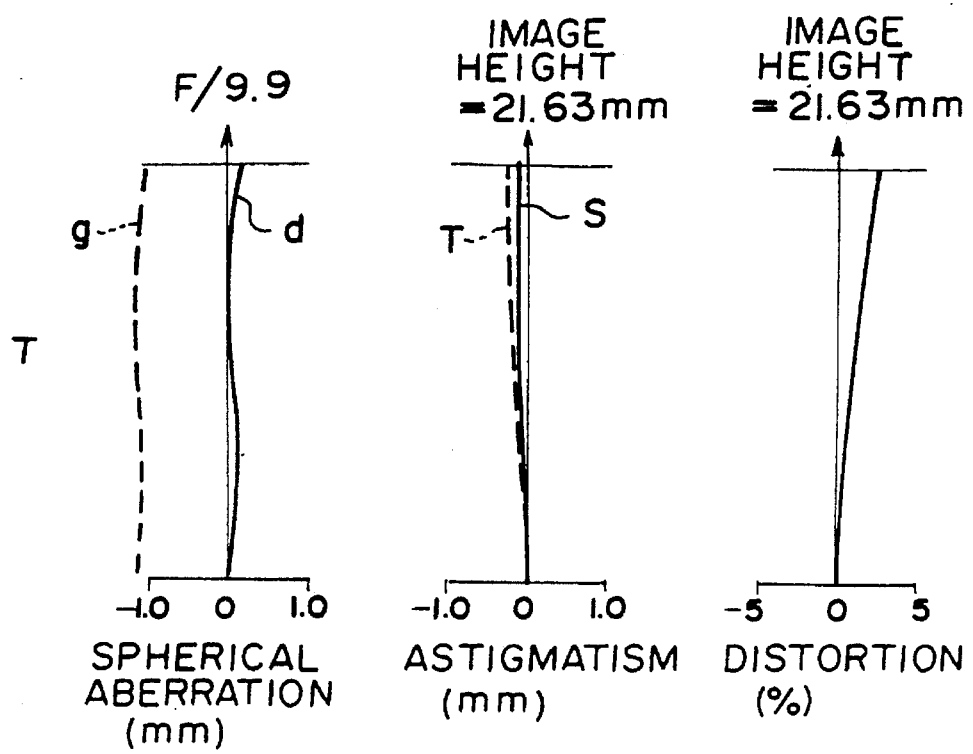
Figure 6:
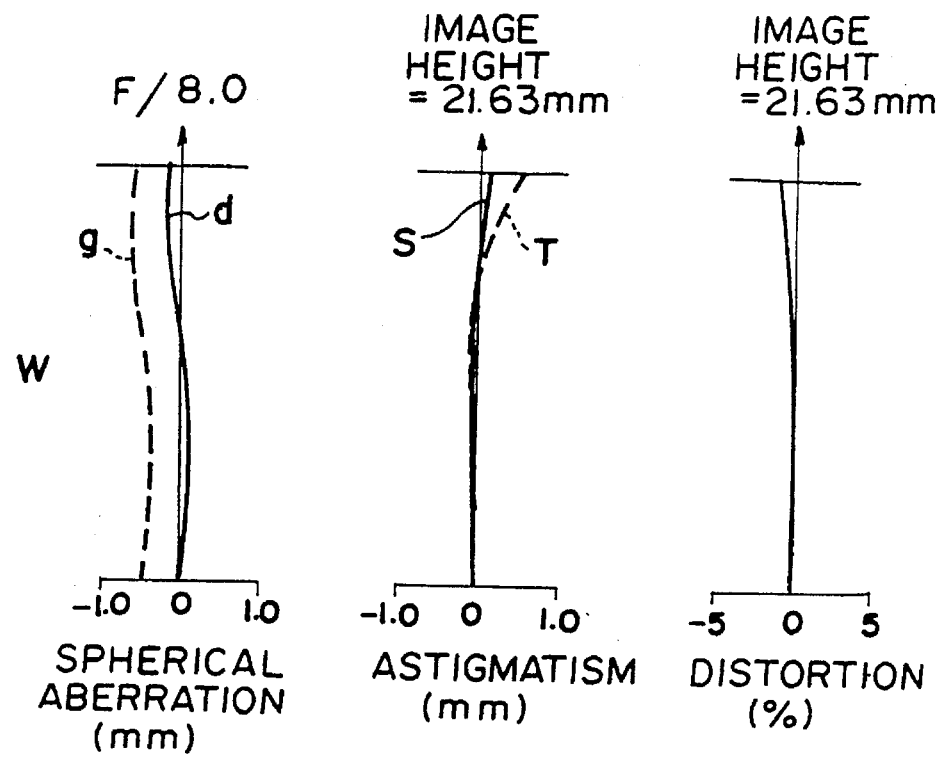
FIG. 6 is a diagram showing the aberrations of the third embodiment of the two-unit zoom lens in accordance with the present invention.
Figure 6:
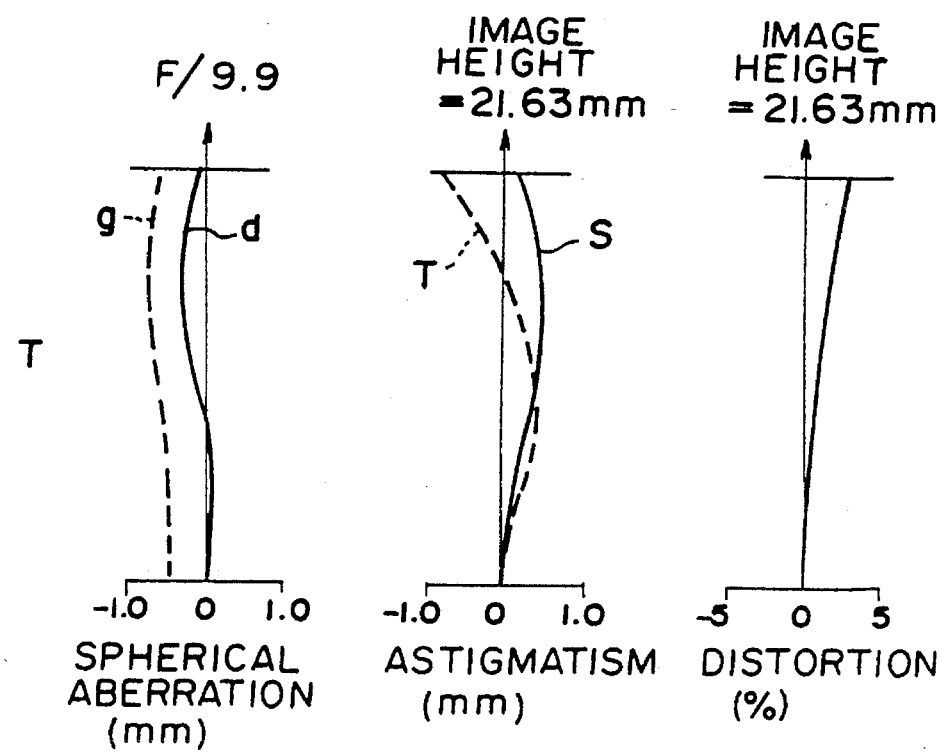

FIGS. 4, 5, and 6 show the aberrations of the first, second, and third embodiments of the two-unit zoom lens in accordance with the present invention. In FIGS. 4, 5, and 6, W represents the spherical aberration, the astigmatism, and the distortion at the wide angle end, and T represents the spherical aberration, the astigmatism, and the distortion at the telescopic end.

The two-unit zoom lens in accordance with the present invention is not limited to the three embodiments described above and may be embodied in any of various other ways. For example, during the zooming operation, the first lens unit may be kept stationary. In such cases, approximately the same effects as those in the aforesaid three embodiments can be obtained.

The two-unit zoom lens in accordance with the present invention is particularly advantageous when being used in a film with lens. The two-unit zoom lens in accordance with the present invention is also applicable in other fields of applications.

What is claimed is:

1. A two-unit zoom lens consisting of a first lens unit having a negative refracting power and a second lens unit having a positive refracting power, said first lens unit and said second lens unit being located in this order from the side of an object, and at least either one of said first lens unit and said second lens unit being moved such that a distance between said first lens unit and said second lens unit, which distance is taken along an optical axis, may change, whereby a focal length of the whole two-unit zoom lens is changed continuously, wherein each of said first lens unit and said second lens unit consists of a single lens component having only two surfaces at least one of which is an aspherical surface.

2. A two-unit zoom lens as defined in claim 1 wherein both surfaces of at least one single lens component are aspherical surfaces.

3. A two-unit zoom lens comprising a first lens unit having a negative refracting power and a second lens unit having a positive refracting power, said first lens unit and said second lens unit being located in this order from the side of an object, and at least either one of said first lens unit and said second lens unit being moved such that a distance between said first lens unit and said second lens unit, which distance is taken along an optical axis, may change, whereby a focal length of the whole two-unit zoom lens is changed continuously, wherein each of said first lens unit and said second lens unit consists of a single lens component having only two surfaces at least one of which is an aspherical surface, and wherein at least one single lens component consists of a combination of a plurality of lens elements which are laminated together into a single lens component.

\* \* \* \* \*